United States Patent [19] [11] 4,225,809
Ogawa et al. [45] Sep. 30, 1980

[54] SIDE PINCUSHION CORRECTION CIRCUIT

[75] Inventors: Seiichi Ogawa, Tokyo; Yoshiaki Ohgawara, Inagi; Kenichi Ohtsuka, Yokohama, all of Japan

[73] Assignee: Sony Corporation, Tokyo, Japan

[21] Appl. No.: 27,713

[22] Filed: Apr. 6, 1979

[30] Foreign Application Priority Data

Apr. 7, 1978 [JP] Japan .................................. 53/41420

[51] Int. Cl.² ............................................. H01J 29/70
[52] U.S. Cl. ..................................... 315/371; 315/408
[58] Field of Search ................................. 315/371, 408

[56] References Cited
U.S. PATENT DOCUMENTS

| 4,042,858 | 8/1977 | Collette et al. ................... 315/408 X |
| 4,088,931 | 5/1978 | Haferl ................................... 315/371 |
| 4,101,814 | 7/1978 | Haferl ................................... 315/371 |
| 4,118,656 | 10/1978 | Dietz ..................................... 315/371 |

Primary Examiner—Malcolm F. Hubler
Attorney, Agent, or Firm—Lewis H. Eslinger; Alvin Sinderbrand

[57] ABSTRACT

A side pincushion distortion correction circuit has an impedance circuit connected in series with the deflection coil in a television receiver. A controllable switch connected in parallel with the impedance circuit is operated by a switching signal, the phase of which is modulated by a combination of a parabolic signal at the vertical rate and a control signal corresponding to the brightness of a reproduced picture on the screen of the television receiver in order to maintain proper correction of side pincushion distortion despite variations in the brightness of a picture reproduced on the cathode ray tube of the television receiver.

16 Claims, 22 Drawing Figures

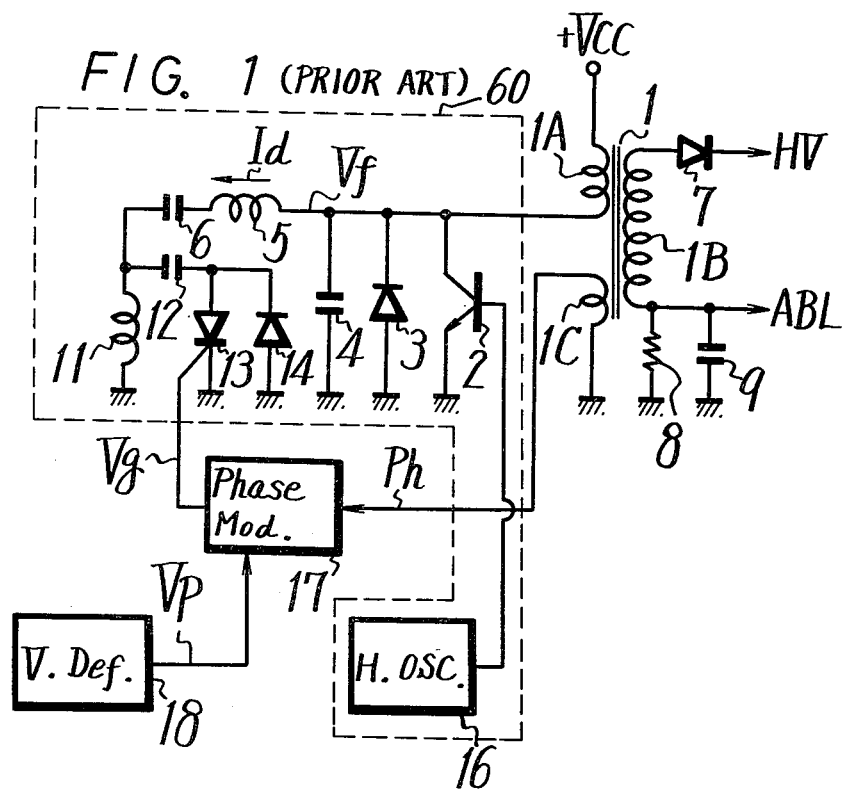
FIG. 1 (PRIOR ART)
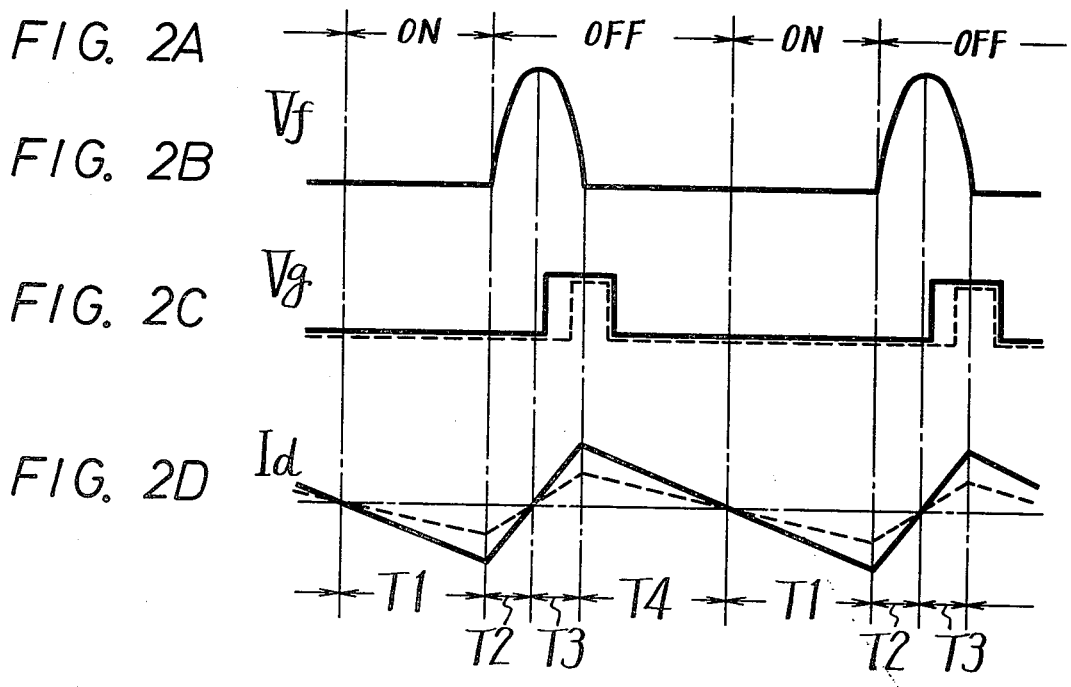
FIG. 2A
FIG. 2B
FIG. 2C
FIG. 2D

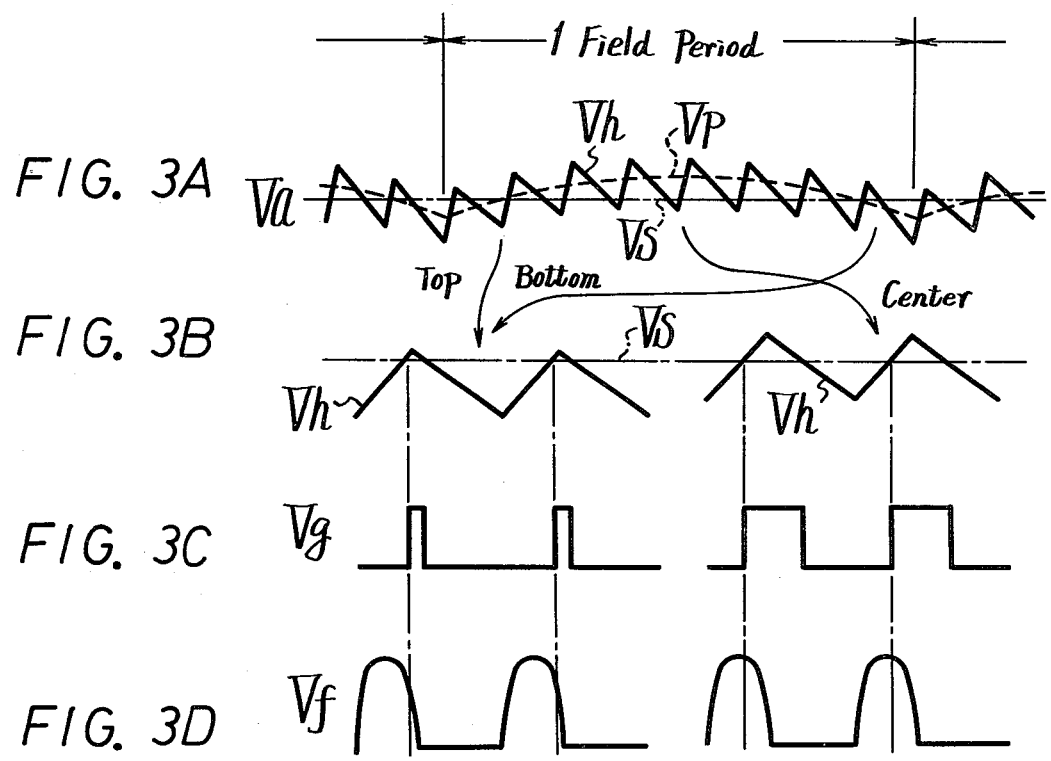
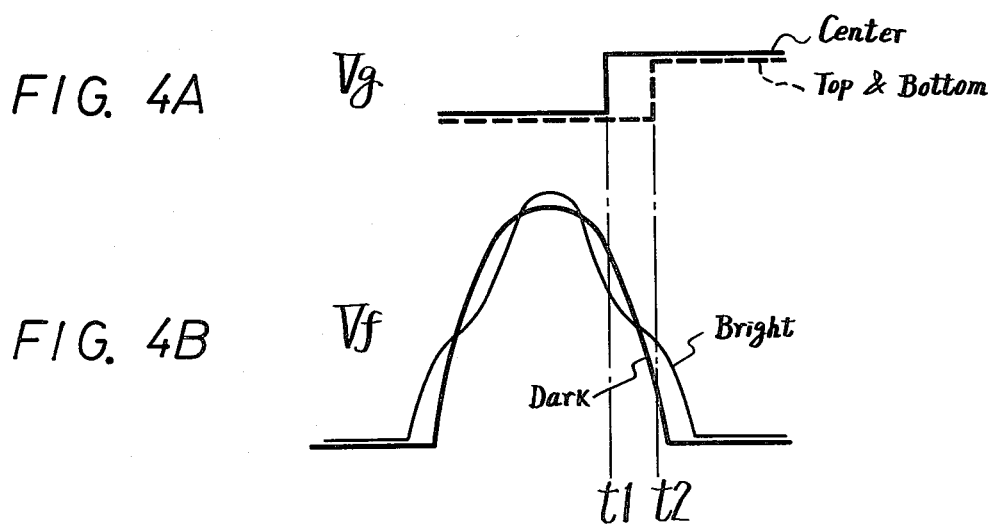

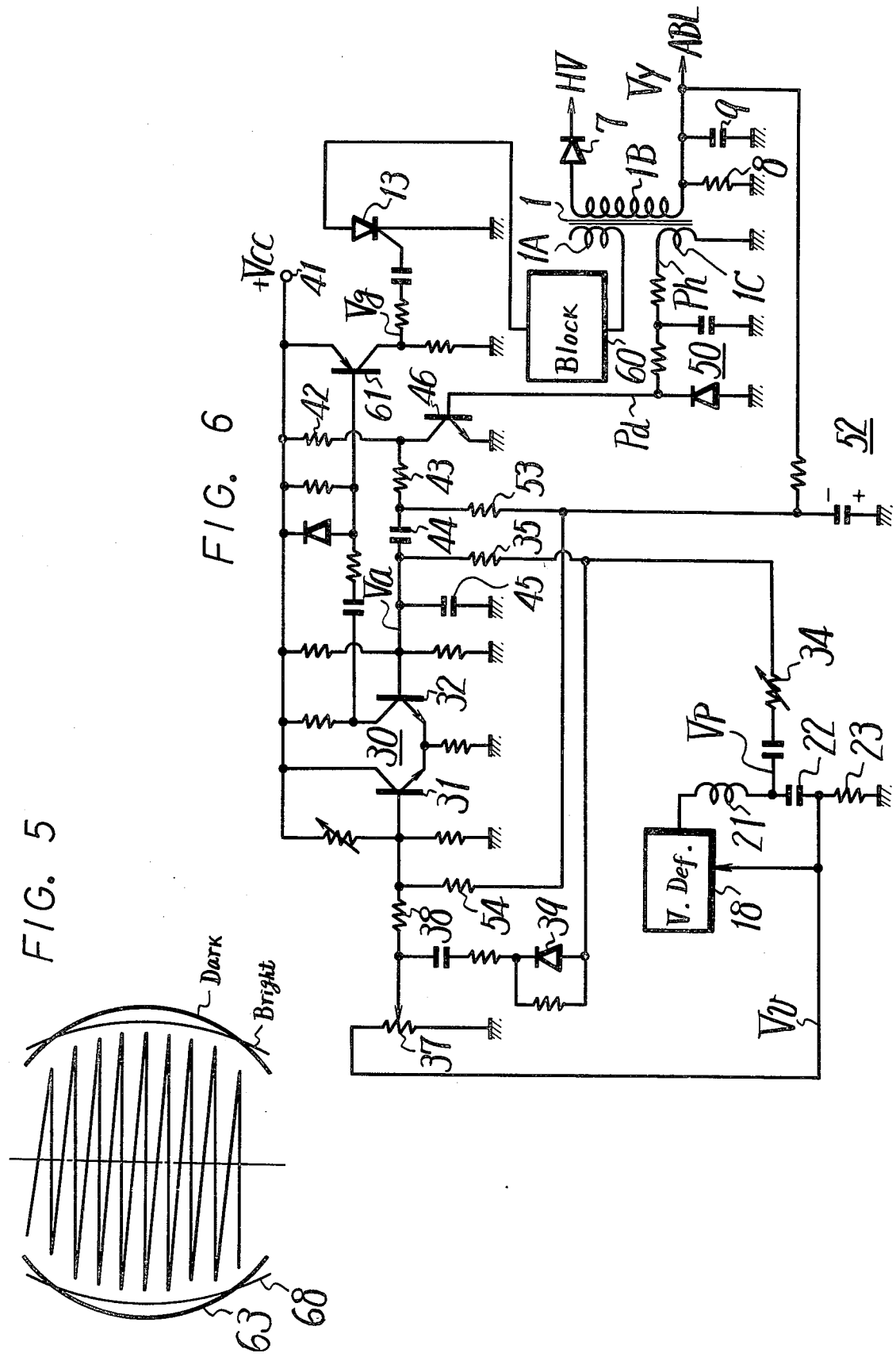

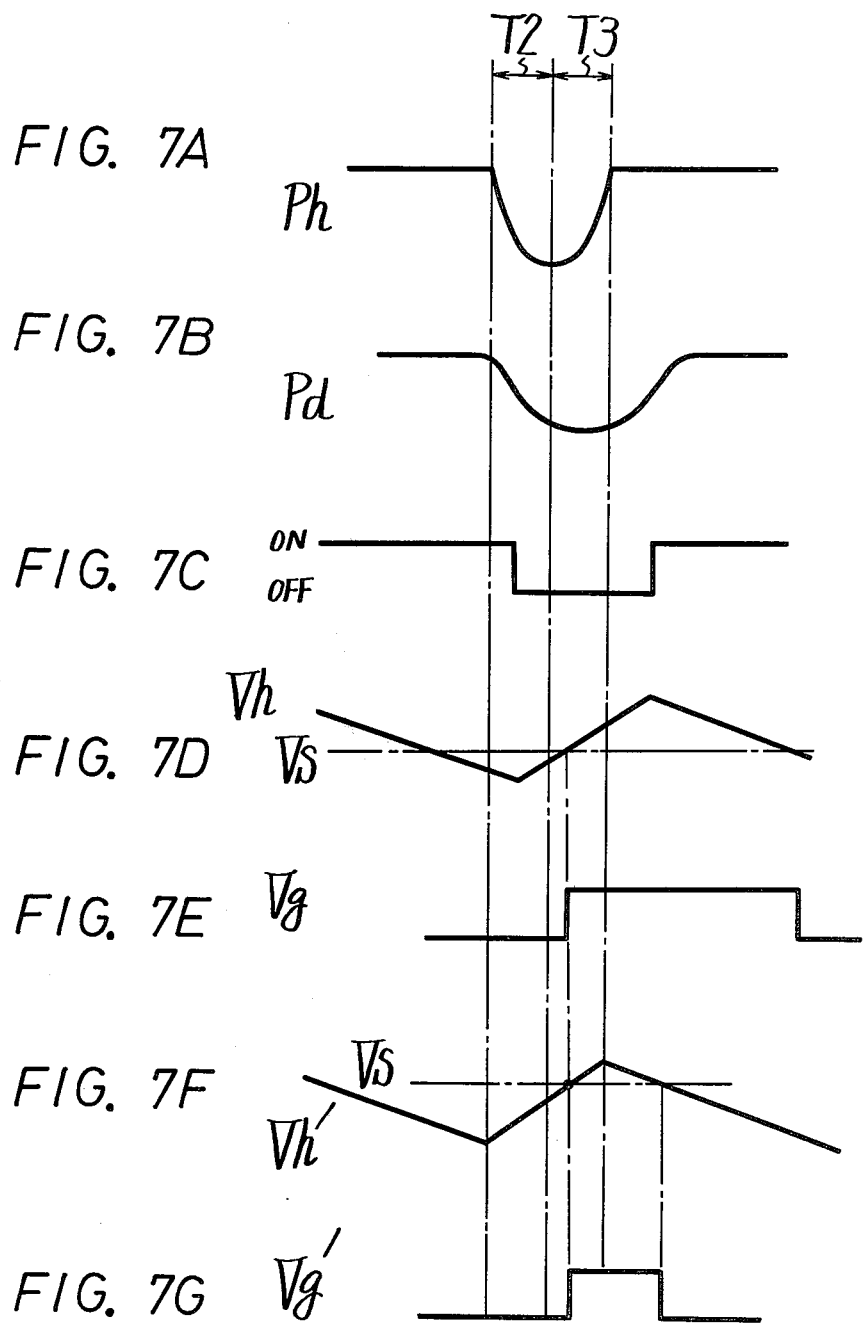

SIDE PINCUSHION CORRECTION CIRCUIT

BACKGROUND OF THE INVENTION

1. Field of the Invention

This invention generally relates to a television receiver, and more particularly to a correction circuit for side pincushion distortion of the raster in the television receiver.

2. Description of the Prior Art

It is known in the art that side pincushion distortion of the raster on a cathode ray tube in a television receiver may be substantially eliminated by modulating the horizontal deflection current with a parabolic signal at the vertical scanning rate. In one known arrangement; a saturable reactor is connected in series with a horizontal deflection coil in the television receiver. The impedance of the reactor is modulated by the vertical parabolic signal. In another known arrangement, the power supply voltage supplied to a horizontal deflection circuit in the television receiver is modulated with the vertical parabolic signal. Although these arrangements are capable of correcting outside pincushion distortion, they are unable to eliminate inside pincushion distortion. A side pincushion distortion correcting circuit is disclosed in U.S. Pat. No. 4,088,931 in which inside pincushion distortion can be corrected. In this circuit, a correcting coil is connected in series. with the horizontal deflection coil, and the series circuit of a capacitor and a controllable switch is connected in parallel with the correcting coil. The controllable switch is turned on during the latter half of the horizontal retrace period at a time which is modulated by the parabolic wave signal at the vertical rate. The impedance of the circuit connected in series to the horizontal deflection coil is thus modulated by the parabolic wave signal, and side pincushion distortion of the raster is eliminated. Further, the amount of the S-shape correction is also modulated by the parabolic wave signal, so that inside pincushion distortion is also eliminated.

Pincushion distortion in the prior art correction circuit described above varies with the brightness of the raster. Therefore proper correction of side pincushion distortion can not be achieved for a picture having varying brightness. Furthermore, since this variation occurs dynamically in response to the brightness of a picture being reproduced, the amount of correction of side pincushion distortion also varies dynamically. Such dynamic variation is very undesirable in the reproduced picture.

OBJECTS AND SUMMARY OF THE INVENTION

Accordingly, it is an object of the invention to provide an improved side pincushion distortion correction circuit for use with a television receiver in which the proper correction for side pincushion distortion is achieved in spite of brightness variations of a reproduced picture.

Another object of the invention is to provide an improved side pincushion distortion correction circuit for use with a television receiver in which linear correction of side pincushion distortion can be achieved.

A further object of the invention is to provide an improved side pincushion distortion correction circuit for use with a television receiver in which the power dissipation in a controllable switch can be reduced.

In accordance with an aspect of the present invention, there is provided a side pincushion distortion correction circuit for use with a television receiver in which an impedance is connected in series to a horizontal deflection coil, a series circuit of a capacitor and a controllable switch, connected in series with the impedance means for generating a control signal at the horizontal rate, the phase of which is modulated by a parabolic signal at the vertical rate, which is supplied to the controllable switch, whereby side pincushion distortion of the raster is corrected. The phase of the control signal is further controlled by a signal corresponding to the brightness of a reproduced picture. Thereby, the proper correction of the side pincushion distortion can be achieved in spite of the variations in the brightness of the reproduced picture.

In accordance with a feature of the invention, there is provided the side pincushion distortion correction circuit for a cathode ray tube deflection circuit capable of displaying a picture having varying brightness of the type which produces a horizontal deflection signal including a retrace portion for application to a horizontal deflection winding and a vertical deflection signal comprising an impedance connected in series with the horizontal deflection winding operative to limit current through the horizontal deflection winding, controllable switch means responsive to a switching signal for bypassing the impedance, switching signal generating means for generating the switching signal during the retrace portion; means for producing a brightness signal which is variable in proportion to said brightness; means for producing a parabolic signal in synchronism with the vertical deflection signal; means for producing a sawtooth signal at the same rate as said horizontal deflection signal, and the switching signal generating means being responsive to the brightness signal, the parabolic signal and the sawtooth signal to generate the switching signals at a time which is variable in dependence thereon.

The above and other objects, features and advantages of the present invention will become clear from the following description taken in conjunction with the accompanying drawings in which the like references designate the same elements.

BRIEF DESCRIPTION OF THE DRAWINGS

FIG. 1 is a side pincussion distortion correction circuit according to the prior art;

FIGS. 2A-2D are waveforms to which reference will be made in explaining the operation of the pincushion distortion circuit of FIG. 1;

FIGS. 3A-3D are waveforms to which reference will be made in explaining the operation of the pincushion distortion circuit of FIG. 1;

FIGS. 4A and 4B are waveforms to which reference will be made in explaining the effect of varying picture brightness on the prior art pincushion distortion correction circuit of FIG. 1;

FIG. 5 shows an envelope of horizontal deflection current in the horizontal deflection coil of FIG. 1;

FIG. 6 shows a schematic diagram of a side pincushion distortion correction circuit in accordance with an embodiment of the present invention;

FIGS. 7A-7G are waveforms to which reference will be made in explaining the operation of the circuit of FIG. 6;

DESCRIPTION OF THE PREFERRED EMBODIMENTS

Figure 8:
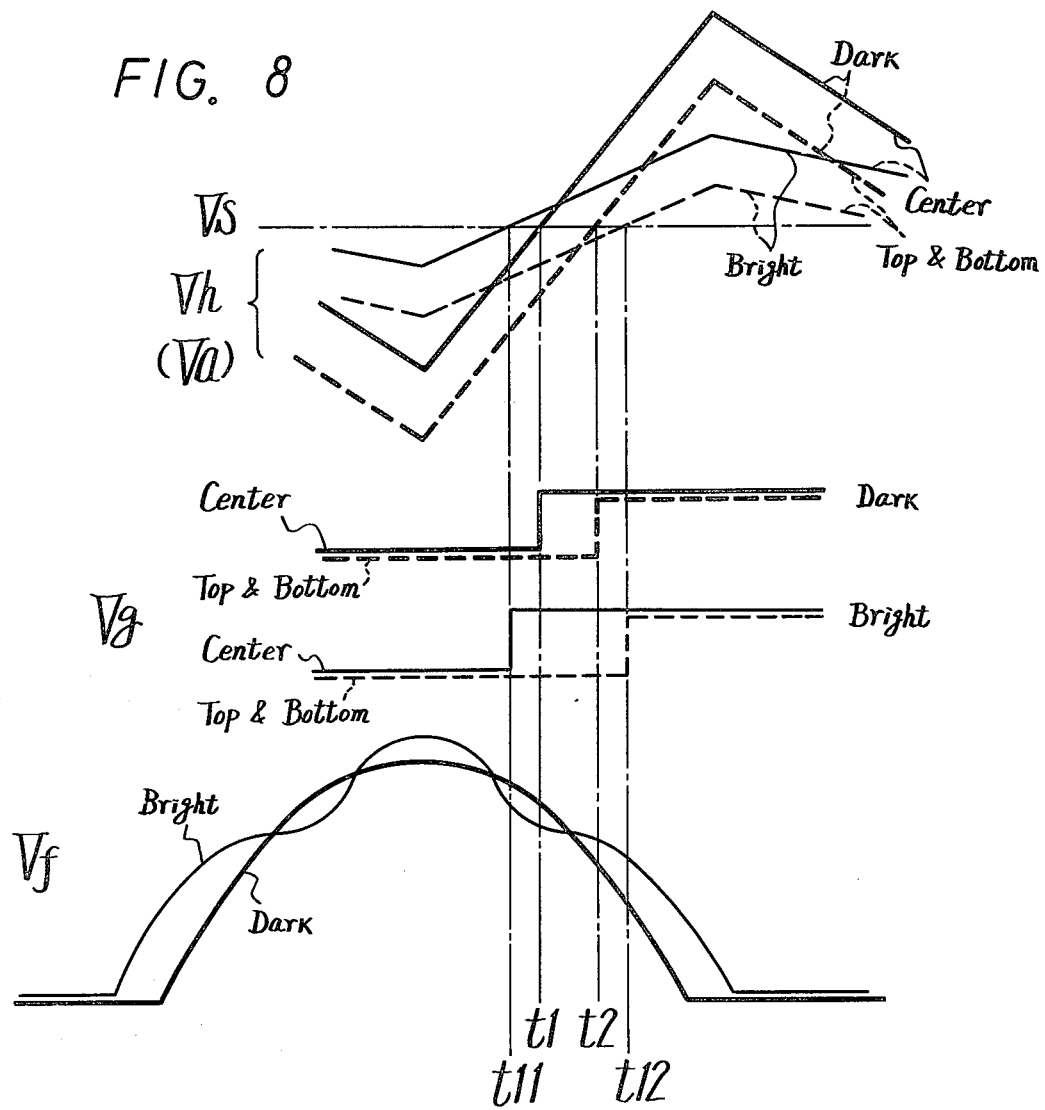
FIG. 8 shows waveforms to which reference will be made in explaining the operation of the circuit of FIG. 6.

Before describing the invention, an example of a prior art side pincushion distortion correcting circuit is described with reference to FIG. 1.

The collector-emitter path of a switching transistor 2, a damper diode 3 and a resonant capacitor 4 in parallel with each other are connected between one end of an input winding 1A of a flyback transformer 1 and ground. A horizontal deflection winding 5, an S-shape correction capacitor 6 and a winding 11 are also connected in series between input winding 1A and ground. A series circuit of a capacitor 12 having a high capacitance and thyristor 13, which has its anode connected to the capacitor 12 and its cathode grounded, is connected in parallel with winding 11. A diode 14 is connected in parallel with thyristor 13. Switching base of the transistor 2 is supplied with horizontal pulses from a horizontal oscillator 16. A horizontal feedback pulse Ph induced in a feedback winding 1C of transformer 1 is fed to a phase modulating circuit 17, and a vertical parabolic voltage P from a vertical deflection circuit 18 is also fed to phase modulating circuit 17. A modulated output signal Vg from phase modulating circuit 17 is applied to the gate of thyristor 13.

A high voltage rectifier diode 7 is connected to one end of a high voltage winding 1B of flyback transformer 1 and a DC high voltage HV therefrom is applied to a cathode ray tube of a television receiver (not shown). A resistor 8 and a capacitor 9 are connected between the other, or cold, end of winding 1B and ground to deliver therefrom an automatic brightness limiting voltage ABL which provides a negative voltage whose amplitude varies with picture brightness.

For simplification of description, it is initially assumed that the connection point between capacitor 6 and winding 11 is grounded, thus producing a conventional horizontal deflection circuit. During a time period T1 (FIG. 2A) transistor 2 is turned ON by the horizontal pulse from oscillator 16. The collector voltage Vf of the transistor 2 is zero during the period T1 as shown in FIG. 2B. During period T1, the voltage stored or charged in capacitor 6 is discharged through a path from capacitor 6 through deflection winding 5 and transistor 2 so that a gradually increasing current Id flows through deflection winding 5 in the negative direction as shown in FIG. 2D by the solid line. Due to the current Id flowing through winding 5, electro-magnetic energy is gradually stored in winding 5.

At the beginning of the following time period T2, transistor 2 is turned OFF. Due to the energy stored in winding 5 during the period T1, current ID flows from winding 5 through capacitors 4 and 6. Current Id decreases gradually. Capacitor 4 is charged up to voltage Vf by current Id.

During the following time period T3, the energy stored in winding 5 reaches zero and current Id therefore passes through zero (Id=0). The voltage Vf charged in capacitor 4 is now slowly discharged through the path of capacitor 4, winding 5 and capacitor 6 so that voltage Vf decreases while current Id increases.

In the following time period T4, the energy stored in winding 5 by current Id flowing therethrough during the preceding period T3, causes current Id to flow from winding 5 through the capacitor 6 and damper diode 3.

During a complete cycle of periods T1 to T4, the sawtooth waveform current Id flowing through deflection winding 5 as shown by the solid line in FIG. 2D, produces a complete cycle of horizontal deflection.

The elements 12 and 13 connected in series to ground from the connection point of capacitor 6 and winding 11 produce pincushion distortion correction as follows. The amplitude of horizontal deflection current Id depends on the amount of energy stored by current flowing in horizontal deflection winding 5 during period T3. When the relatively large impedance of winding 11 is in series with horizontal deflection winding 5, the current through horizontal deflection winding 5 is reduced and thus the energy stored therein is also reduced. When thyristor 13 is turned ON by the modulated output signal Vg, winding 11 is bypassed to ground through the relatively low impedance of capacitor 12 in series with the anode-to-cathode path of thyristor 13. This effectively bypasses winding 11 and increases the current through horizontal deflection winding 5.

When voltage Vg turns On at a time which is relatively late in period T3 as shown by the dotted line in FIG. 2C, thyristor 13 remains OFF during most of period T3. The discharging current from capacitor 4 is thus limited to a low value as long as thyristor 13 is OFF. Hence the amplitude of horizontal deflection current Id remains as shown by the broken line in FIG. 2D.

Conversely, when voltage Vg turns ON at a time which is relatively early in period T3 as shown by the solid line in FIG. 2C, thyristor 13 is ON during almost the entire period T3. Thus, the discharging current of capacitor 4 is large and the horizontal deflection current Id attains a high value as shown by the solid line in FIG. 2D.

In this manner, the phase at which voltage Vg is turned ON controls the amplitude or maximum level of horizontal deflection current Id.

Modulating circuit 17 produces a sawtooth waveform voltage Vh (FIG. 3A); in synchronism with horizontal feedback pulse Ph. Sawtoothh waveform voltage Vh is superimposed on vertical parabolic voltage Vp. Thus, as shown in FIG. 3A, a voltage Va is produced which is the superposition of the voltages Vp and Vh. The superposed voltages are then sliced at a level Vs to produce a control signal Vg (FIG. 3C). Accordingly, when scanning the upper and lower portions of the picture screen of a television receiver (not shown), voltage Vh is lower with respect to the slice level Vs as shown on the left side of FIG. 3B, so that a voltage Vg is produced having the phase at which it is turned ON retarded as shown to the left of FIGS. 3C and 3D. While scanning the center portion of the picture screen, the voltage Vh is higher relative to the slice level Vs as shown to the right side of FIG. 3B. The phase of turning ON voltage Vg is therefore advanced, as shown on the right sides of FIGS. 3C and 3D.

As a result of the functions described in the foregoing, horizontal deflection current Id is low in amplitude on the upper and lower portions of the picture screen and is high in amplitude in the center portion of the screen so that the pincushion distortions on the left and right sides of the picture screen are corrected.

However, with the pincushion distortion correction circuit of FIG. 1, since the voltage Vg is derived from horizontal pulse Ph and parabolic voltage Vp (FIGS. 3A-3C), when the brightness on the picture screen varies it is difficult to suitably correct pincushion distortion. When the picture screen is relatively dark, the load current from the transformer 1 is relatively small. The flyback pulse voltage Vf is a half cycle of a sine wave as shown by the thick solid line in FIG. 4B. Conversely, when the picture screen is relatively bright and the load cuurrent from transformer 1 is relatively large, the waveform pulse voltage Vf is distorted as shown by the thin solid line in FIG. 4B due to variation in the resonant frequency of transformer 1 etc.

Accordingly, when voltage Vg is turned ON at a relatively early time t1, as necessary to provide pincushion correction in the center of the picture screen as shown by the solid line in FIG. 4A, the voltage Vf at time t1 on a bright screen is lower than the voltage Vf at the same time t1 on a dark screen. Thus, as shown in FIG. 5, the envelope of deflection current Id is smaller in the center of a bright screen (shown by the thin solid line 68) than it is in the center of a dark screen (shown by the thick solid line 63). Thus, when properly adjusted for a dark screen, for example, pincushion distortion correction in the center of a bright screen is insufficient.

Conversely, when voltage Vg is turned ON late in time t2 as required for the upper and lower portions of the picture screen, the level of voltage Vf at time t2 on a bright screen is higher than it is at the same time t2 on a dark screen. Thus, as shown in FIG. 5, the amplitude of deflection current Id at the upper and lower portions of a bright screen is greater than it is on a dark screen. Thus, excessive pincushion distortion correction is produced at the upper and lower portions of a bright screen.

Referring now to FIG. 6, there is shown a pincushion distortion correction circuit according to an embodiment of the present invention which avoids the problems of the prior art. The vertical deflection circuit 18 is connected to ground through a series circuit including a vertical deflection winding 21, an integration capacitor 22 and a feedback resistor 23. When the vertical deflection current is applied to vertical deflection winding 21, a vertical sawtooth waveform voltage Vv is derived from the connection point between integrating capacitor 22 and feedback resistor 23. Voltage Vv is fed back to deflection circuit 18.

A differential amplifier 30 which is formed of transistors 31 and 32. The connection point between winding 21 and capacitor 22 is connected through resistors 34 and 35 to the base of transistor 32. The connection point between integrating capacitor 22 and feedback resistor 23 is connected through resistors 37 and 38 to the base of transistor 31. The connection point between resistors 34 and 35 is connected through a diode 39 to the connection point between resistors 37 and 38.

A series circuit consisting of resistors 42, 43 and capacitors 44, 45 is connected between a power supply terminal 41 +Vcc and ground. The connection point of capacitors 44 and 45 is connected to the base of transistor 32, and the collector-emitter path of a transistor 46 is inserted between the connection point of resistors 42, 43 and ground.

A feedback winding 1C of flyback transformer 1 is connected through a delay circuit 50 to the base of transistor 46. The connection point of winding 1B of transformer 1 with resistor 8 and capacitor 9 is connected through a filter 52 and a resistor 53 to the connection point of resistor 43 and capacitor 44 and also through a resistor 54 to the base of transistor 31. The collector of transistor 32 is connected through a common emitter transistor 61 to the gate of thyristor 13.

A block 60 identifies a circuit which is substantially the same as block 60 in FIG. 1 except that thyristor 13, which was included in block 60 of FIG. 1, is shown separately since thyristor 13, and especially its gate connection, is important to disclosure of the present invention.

Vertical parabolic voltage Vp is obtained at the connection point between deflection winding 21 and capacitor 22 and is applied through resistors 34 and 35 to the base of transistor 32. Horizontal feedback pulse Ph (FIG. 7A) from feedback winding 1C of flyback transformer 1 is fed to a delay circuit 50 which delays pulse Ph by a predetermined period to form a delayed pulse Pd (FIG. 7B). Delayed pulse Pd is fed to transistor 46 where it turns transistor 46 OFF during pulse Pd (FIG. 7C). While transistor 46 is OFF, capacitor 45 is charged from power supply terminal 41 through resistors 42, 43 and capacitor 44. While transistor 46 is ON, capacitor 45 discharges through capacitor 44, resistor 43 and the emitter-collector path of transistor 46. Thus the sawtooth waveform voltage Vh appears across capacitor 45 in synchronism with pulse Pd (FIG. 7D).

Voltage Vh produced by the charge and discharge of capacitor 45 is superimposed on vertical parabolic voltage Vp fed through resistor 35 to produce voltage Va which is applied to the base of transistor 32 (FIG. 3A). Voltage Va at the base of transistor 32 is compared with the slicing level Vs at the base of transistor 31. When Va exceeds Vs, the voltage at the collector of transistor 32 changes from high to low. The signal at the collector of transistor 32 is inverted in transistor 61 to produce phase modulating voltage Vg (FIG. 3C).

Parabolic voltage Vp, applied through resistors 34 and 35 to the base of transistor 32, contains a component of the vertical sawtooth waveform voltage Vv. The vertical sawtooth waveform voltage Vv developed across resistor 23 is fed through resistors 37 and 38 to transistor 31 in differential amplifier 30. Since the component of vertical sawtooth waveform voltage Vv is applied to both inputs of differential amplifier 30, the vertical sawtooth waveform voltage component Vv is cancelled. Parabolic voltage Vp is sliced by diode 39 and fed to transistor 32 to correct the waveform of parabolic voltage Vp.

Voltage Vg obtained at the collector of transistor 61 is applied to the gate of thyristor 13, to correct pincushion distortion in the horizontal direction. Even though the amplitude of voltage Vh varies in response to varying brightness on the picture screen, proper pincushion correction is achieved. A part of the charging current of capacitor 45 flowing through resistors 42 and 43, is divided to flow through resistor 53. When the picture is relatively dark, ABL voltage Vy or the brightness signal is a negative voltage of relatively low level and hence the voltage at the output terminal of filter 52 is also a negative voltage of relatively low level. The divided current flowing through the resistor 53 is thus small so that the charging current fed to capacitor 45 is relatively undisturbed by the presence of a dividing path through resistor 53. The amplitude of horizontal sawtooth waveform voltage Vh obtained across capacitor 45 is thus relatively large. Accordingly, the amplitude of voltage Vg is relatively large as shown by thick solid and dotted lines in FIG. 8.

Conversely, when the picture is relatively bright, ABL voltage Vy is a negative voltage of relatively high level and the voltage at the output terminal of filter 52 is a negative voltage of relatively high level. The current flowing through resistor 53 increases and reduces the charging current to capacitor 45. Hence the amplitude of horizontal sawtooth waveform voltage Vh obtained across capacitor 45 is reduced as shown in FIG. 8 by thin solid and dotted lines. Accordingly, at the center of the picture screen the phase of turning ON voltage Vg is advanced to a time t 11, and the level of voltage Vf at time t 11 on a bright screen is equal to (or somewhat greater than) the level of voltage Vf at time t1 on a dark screen. The deflection currents Id are thus made equal in amplitude at the center of the picture screen for both dark and light pictures.

Further, at the upper and lower sides of the picture screen, the phase of turning ON voltage Vf is retarded to a time t 12, and the level of voltage Vf at time t 12 on a bright is equal to (or somewhat greater than) the level of voltage Vf at time t2 on a dark picture. Thus deflection currents Id at the top and bottom are again equal in amplitude for both dark and light pictures. Accordingly, even when the brightness on the picture is varied, an optimum amount of side pincushion distortion correction is applied.

The following paragraphs explain why horizontal pulse Ph from winding 1C of flyback transformer 1 is delayed in delay circuit 50 before being applied to transistor 46. If horizontal pulse Ph were applied to the base of transistor 46 without being delayed, transistor 46 would be turned ON and OFF substantially in synchronism with horizontal pulse Ph and voltage Vh obtained across capacitor 45 would be a voltage Vh' as shown in FIG. 7F. Since horizontal pulse Ph and pulse voltage Vf have the same phase, in order to turn voltage Vg ON during time period T3, the slice level Vs must be increased to slice voltage Vh' near its maximum value as shown in FIG. 7F.

However, the voltage Vh' in the circuit shown in FIG. 6, is derived from the charge and discharge of capacitor 45. The linearity of such a capacitor charge and discharge is good in the vicinity of its center but is degraded near its maximum value. Therefore, when voltage Vh' is sliced near its maximum value to provide a voltage Vg' (refer to FIG. 7G) its linearity is bad and hence the resulting pincushion distortion correction is inaccurate.

In the circuit shown in FIG. 6, since delayed pulse Pd, delayed in delay circuit 50, is fed to transistor 46 rather than undelayed horizontal pulse Ph, the slice level Vs (FIG. 3A), which slices the voltage Vh obtained across capacitor 45, can be set substantially at or near the center of voltage Vh where its linearity is good, the afore-mentioned defect can be removed.

Further, when the brightness on the picture screen changes and hence the high voltage HV changes, the horizontal deflection width also changes. However, since ABL voltage Vy is fed through filter 52 and resistor 54 to transistor 31 to change the slice level Vs, the amplitude of deflection current Id is changed to correct for variations in horizontal deflection width caused by the high voltage variation.

Figure 9:
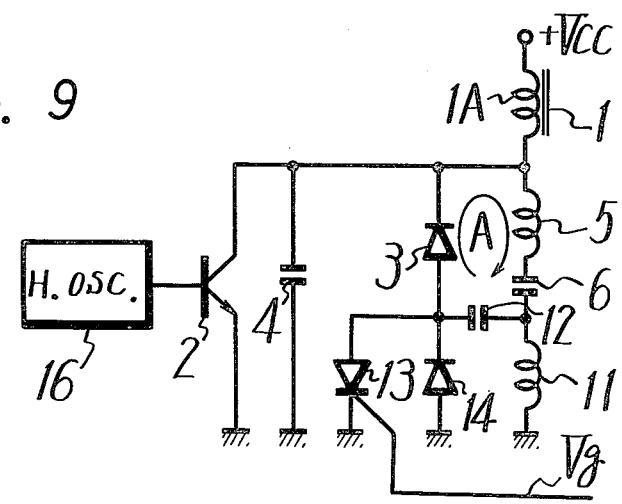
FIG. 9 shows a circuit diagram showing another circuit to which a pincushion distortion correction signal of the present invention is applied.

FIG. 9 shows a pincushion distortion correction circuit according to another embodiment of the invention. The anode of damper diode 3 is not grounded as in the embodiment shown in FIG. 1, but instead is connected to the connection point between the anode of thyristor 13 and capacitor 12. In FIG. 1, since thyristor 13 continues to be conductive during the time period T4 during which the damper current also flows, the damper current flows through thyristor 13 with the result that power is needlessly consumed by thyristor 13. However, in the circuit of FIG. 9, when damper current begins to flow as indicated by an arrow A it does not flows through the thyristor 13 during the period T4 i.e. damper current flows through thyristor 13 only during the period T3. Thus, power consumption caused by current through thyristor 13 is reduced.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. A side pincushion distortion correction circuit for a cathode ray tube deflection apparatus including a horizontal deflection generator for generating a horizontal scanning current and a horizontal pulse during a retrace interval thereof and a vertical deflection generator for generating a vertical scanning current during a vertical scan interval and a parabolic wave signal synchronized therewith, comprising, a horizontal deflection winding coupled to said horizontal deflection generator for accepting said horizontal scanning current;

an impedance circuit connected in series with said horizontal deflection winding;

controllable switch means including a controllable switch having a control electrode and a controlled current path connected in parallel with said impedance circuit;

switching signal generating means for generating a switching signal responsive to said horizontal pulse;

means for modulating the phase of said switching signal by said parabolic wave signal at the vertical rate;

means for supplying said switching signal to said control electrode of said controllable switch for operating said controllable switch during the latter half of said horizontal retrace interval;

means for progressively advancing said phase of said switching signal during a first portion of the vertical scan interval and for progressively retarding said phase during a second portion of the vertical scan interval for altering said scanning current in a manner to reduce pincushion distortion;

means for generating a brightness signal corresponding to the brightness of a reproduced picture; and means for further modulating said phase of said switching signal in dependence on said brightness signal.

2. A side pincushion distortion correction circuit according to claim 1, wherein said controllable switch means includes a capacitor connected to form a series circuit with said controllable switch and said series circuit being connected in parallel with said impedance circuit.

3. A side pincushion distortion correction circuit according to claim 2, wherein said controllable switch means includes a diode connected in parallel with said controllable switch, said controllable switch and said diode having polarities, the polarity of said diode being opposite to the polarity of said controllable switch.

4. A side pincushion distortion correction circuit according to claim 1, wherein said horizontal deflection generator includes a flyback transformer having at least primary and secondary windings and a high voltage rectifying circuit connected to said secondary winding, said secondary winding having at least a cold end, and said means for generating said brightness signal being connected at said cold end of said secondary winding.

5. A side pincushion distortion correction circuit according to claim 1, wherein said means for modulating includes delay means for delaying said horizontal pulse.

6. A side pincushion distortion correction circuit according to claim 3, wherein said horizontal deflection generator includes a switching device and a damper diode having an anode terminal and a cathode terminal, said anode terminal being connected to the connection point of said capacitor and said controllable switch.

7. A side pincushion distortion correction circuit for a cathode ray tube deflection circuit capable of displaying a picture having varying brightness of the type which produces a horizontal deflection signal including a retrace portion for application to a horizontal deflection winding and a vertical deflection signal, comprising:
   an impedance connected in series with said horizontal deflection winding operative to limit current through said horizontal deflection winding;
   controllable switching means responsive to a switching signal for bypassing said impedance;
   switching signal generating means for generating said switching signal during said retrace portion;
   means for producing a brightness signal which is variable in proportion to said brightness;
   means for producing a parabolic signal in synchronism with said vertical deflection signal;
   means for producing a sawtooth signal at the same rate as said horizontal deflection signal; and
   said switching signal generating means being responsive to said brightness signal, said parabolic signal and said sawtooth signal to generate said switching signal at a time which is variable in dependence thereon.

8. A side pincushion distortion correction circuit according to claim 7; wherein said means for producing a sawtooth signal includes:
   a flyback transformer;
   feedback winding means on said flyback transformer for sampling a signal during said flyback portion;
   delay means for delaying the sampled signal to produce a delayed signal;
   a transistor operative in response to said delayed signal to turn ON and turn OFF; and
   a resistance-capacitance charging and discharging circuit operative to charge when said transistor is OFF and to discharge when said transistor is ON whereby said sawtooth signal is produced.

9. A side pincushion distortion correction circuit according to claim 8; wherein said means for producing a brightness signal includes:
   a secondary winding having first and second ends on said flyback transformer;
   high voltage rectifying connected to said first end;
   a resistor and a capacitor connected in parallel between said second end and ground; and
   filter means for filtering a signal at said second end to produce said brightness signal.

10. A side pincushion distortion correction circuit according to claim 9; wherein said resistance-capacitance charging and discharging circuit includes voltage divider means, said brightness signal being connected from said second end to said voltage divider means whereby the amplitude of said sawtooth signal is modified by said brightness signal.

11. A side pincushion distortion correction circuit according to claim 10; wherein a voltage stored in a capacitance of said resistance-capacitance charging and discharging circuit is applied to said switching signal generating means for generating said switching signal in response to the amplitude of said sawtooth signal exceeding a predetermined value.

12. A side pincushion distortion correction circuit according to claim 11; wherein said predetermined value is established by said brightness signal and said parabolic signal.

13. A side pincushion distortion correction circuit according to claim 12; wherein said switching signal generating means includes a differential amplifier having first and second inputs and an output, said output being connected to said controllable switching means, said first input being connected to said resistance-capacitance discharging circuit and said parabolic signal, said brightness signal being applied to said second input and said parabolic signal being applied through a diode to said second input.

14. A side pincushion distortion correction circuit according to claim 13; wherein said parabolic signal fed at least to said first input contains a component of said vertical deflection signal and means are provided for feeding said vertical deflection signal to said second input whereby said vertical deflection signal is cancelled in said differential amplifier.

15. A side pincushion distortion correction circuit according to claim 7; wherein said controllable switching means includes a thyristor having an anode terminal, a cathode terminal and a gate terminal, said anode terminal being connected through a capacitor to said horizontal deflection winding, said cathode terminal being connected to ground and said switching signal being applied to said gate terminal.

16. A side pincushion distortion correction circuit according to claim 15; further comprising a diode having an anode terminal and a cathode terminal, said anode terminal of said diode being connected to ground, said cathode terminal of said diode being connected to said anode terminal of said thyristor.

* * * * *